(12) United States Patent
Coekaerts

(10) Patent No.: US 7,451,359 B1
(45) Date of Patent: Nov. 11, 2008

(54) HEARTBEAT MECHANISM FOR CLUSTER SYSTEMS

(75) Inventor: Wim A. Coekaerts, San Carlos, CA (US)

(73) Assignee: Oracle International Corp., Redwood Shores, CA (US)

( * ) Notice: Subject to any disclaimer, the term of this patent is extended or adjusted under 35 U.S.C. 154(b) by 1059 days.

(21) Appl. No.: 10/305,483

(22) Filed: Nov. 27, 2002

(51) Int. Cl.
*G06F 11/00* (2006.01)
(52) U.S. Cl. .............................. 714/48; 714/4; 709/223; 709/224
(58) Field of Classification Search ............ 714/4, 714/48; 709/223, 224
See application file for complete search history.

(56) References Cited

U.S. PATENT DOCUMENTS

| | | | |
|---|---|---|---|
| 5,890,154 A * | 3/1999 | Hsiao et al. ................... 707/8 |
| 6,321,218 B1 | 11/2001 | Guay et al. | |
| 6,353,836 B1 | 3/2002 | Bamford et al. | |
| 6,353,898 B1 * | 3/2002 | Wipfel et al. ................. 714/48 |
| 6,393,485 B1 | 5/2002 | Chao et al. | |
| 6,405,274 B1 | 6/2002 | Chan | |
| 6,754,171 B1 * | 6/2004 | Bernier et al. .............. 370/216 |
| 6,779,039 B1 * | 8/2004 | Bommareddy et al. ...... 709/238 |
| 2002/0131423 A1 * | 9/2002 | Chan et al. .................. 370/400 |
| 2003/0061340 A1 * | 3/2003 | Sun et al. .................... 709/224 |

OTHER PUBLICATIONS

Fundamentals of Firewire (1999) www.embedded.com/1999/9906/9906feat2.htm.
International Search Report dated Oct. 1, 2004.
Gregory F. Pfister, In Search of Clusters Second Edition, 1998, pgs: toc & pp. 400-433, Prentice Hall PTR, Prentice-Hall, Inc., Upper Saddle River, NJ.
Yamagiwa, et al., Maestro-Link: A High Performance Interconnect for PC Cluster, 1998, pp. 421-425, Institute of Information Sciences & Elec., Univ. of Tsukuba, Japan.
Mark Bauer, Oracle8i Parallel Server Concepts, Release 2 (8.1.6) (XP-002275984), Release Dec. 1999, Copyright 1996, 1999, pp. 1-47, Oracle Corporation, Redwood Shores, CA.
Veritas Cluster Server 3.5—User's Guide, Solaris, Jul. 2002, pp. 1-30, Veritas Software Corporation, Mountain View, CA.
Sun Cluster 3.0 Dec. 2001 Concepts, XP-002275987, Dec. 2001, pp. 1-51, Sun Microsystems, Inc., Palo Alto, CA.
Hyoudou et al., FireCluster: PC Cluster Employing IEEE 1394, Proceedings of the IEEE Intl. Conf. on Cluster Computing (CLUSTER'00), 2000, pp. 363-364 Dept. of Computer Science, The University of Electro-Communications, Chofu, Tokyo Japan.
Veritas Software Corp., Veritas Cluster Server 3.5, User's Guide (Solaris), Cited in EP 03 789 892, Jul. 2002, N08819F, pp. 1-30, Veritas Corp. Mountain View, CA.

(Continued)

*Primary Examiner*—Emerson C Puente
(74) *Attorney, Agent, or Firm*—Kraguljac & Kalnay, LLC

(57) ABSTRACT

A heartbeat system and method is provided for a cluster system. The cluster includes a plurality of nodes. The nodes access files on one or more data storage devices over a network. The system includes a quorum file that receives and stores heartbeat messages from the plurality of nodes indicating they are active. A network controller connects the quorum file to the plurality of nodes in accordance with IEEE 1394 communication protocol.

2 Claims, 8 Drawing Sheets

OTHER PUBLICATIONS

Kirk Jensen, Innovative IEEE 13394 PHY Design Helps Speed Convergence (White Paper), Philips Semiconductors Interconnectivity Bus. Line, May, 1999, pp. 1-5, Philips Elec., N.V.

European Search Report for Application No. 03 789 892.1—2211 mailed on Jun. 23, 2006.

* cited by examiner

HEARTBEAT MECHANISM FOR CLUSTER SYSTEMS

FIELD OF THE INVENTION

The invention relates to the clustering arts. It finds particular application to a clustering system having a heartbeat system and method.

CROSS REFERENCE TO RELATED APPLICATION

This application is related to U.S. patent application entitled "Clustering System and Method Having Interconnect", Ser. No. 10/305,567 filed Nov. 27, 2002, inventor: Wim Coekaerts, which is also assigned to the present assignee.

BACKGROUND

A cluster is a group of independent servers that collaborate as a single system. The primary cluster components are processor nodes, a cluster interconnect (private network), and a disk subsystem. The clusters share disk access and resources that manage the data, but each distinct hardware cluster nodes do not share memory. Each node has its own dedicated system memory as well as its own operating system, database instance, and application software. Clusters can provide improved fault resilience and modular incremental system growth over single symmetric multiprocessors systems. In the event of subsystem failures, clustering ensures high availability. Redundant hardware components, such as additional nodes, interconnects, and shared disks, provide higher availability. Such redundant hardware architectures avoid single points-of-failure and provide fault resilience.

In a database cluster, CPU and memory requirements for each node may vary depending on the database application. Performance and cost requirements also vary between database applications. One factor that contributes to performance is that each node in a cluster needs to keep other nodes in that cluster informed of its health and configuration. This has been done by periodically broadcasting a network message, called a heartbeat, across a network. The heartbeat signal is usually sent over a private network, a cluster interconnect, which is used for internode communications. However, lost or delayed heartbeat messages may cause false reports that a node is not functioning.

In prior systems, the cluster interconnect has been built by installing network cards in each node and connecting them by an appropriate network cable and configuring a software protocol to run across the wire. The interconnect was typically a low-cost/slow-speed Ethernet card running TCP/IP or UDP, or a high-cost/high-speed proprietary interconnect like Compaq's Memory Channel running Reliable DataGram (RDG) or Hewlett-Packard's Hyperfabric/2 with Hyper Messaging Protocol (HMP). A low-cost/high-speed interconnect would reduce clustering costs for users and reduce latency during run-time.

SUMMARY

In one embodiment, a heartbeat mechanism for a cluster system including a plurality of nodes is provided. In one aspect, the system comprises a quorum file that receives heartbeat messages from the plurality of nodes. A network controller connects the quorum file to the plurality of nodes where the network controller provides communication with the quorum file in accordance with IEEE 1394 protocol.

In accordance with another embodiment of the present invention, a method of monitoring nodes in a cluster is provided. A quorum file is allocated for storing status messages received from nodes in the cluster. Status messages are periodically received from a node in the cluster indicating that the node is active where the status message is received based on IEEE 1394 communication protocol.

BRIEF DESCRIPTION OF THE DRAWINGS

In the accompanying drawings which are incorporated in and constitute a part of the specification, embodiments of a system and method are illustrated, which, together with the detailed description given below, serve to describe the example embodiments of the system and method. It will be appreciated that the illustrated boundaries of elements (e.g. boxes or groups of boxes) in the figures represent one example of the boundaries. One of ordinary skill in the art will appreciate that one element may be designed as multiple elements or that multiple elements may be designed as one element. An element shown as an internal component of another element may be implemented as an external component and vise versa.

DETAILED DESCRIPTION OF ILLUSTRATED EMBODIMENTS

The following includes definitions of selected terms used throughout the disclosure. Both singular and plural forms of all terms fall within each meaning:

"Computer-readable medium" as used herein refers to any medium that participates in directly or indirectly providing signals, instructions and/or data to a processor for execution. Such a medium may take many forms, including but not limited to, non-volatile media, volatile media, and transmission media. Non-volatile media may include, for example, optical or magnetic disks. Volatile media may include dynamic memory. Transmission media may include coaxial cables, copper wire, and fiber optic cables. Transmission media can also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, a PROM, an EPROM, a FLASH-EPROM, any other memory chip or cartridge, a carrier wave/pulse, or any other medium from which a computer can read.

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic such as an application specific integrated circuit (ASIC), or other programmed logic device. Logic may also be fully embodied as software.

"Signal", as used herein, includes but is not limited to one or more electrical signals, analog or digital signals, a change in a signal's state (e.g. a voltage increase/drop), one or more computer instructions, messages, a bit or bit stream, or other means that can be received, transmitted, and/or detected.

"Software", as used herein, includes but is not limited to one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

Figure 1:
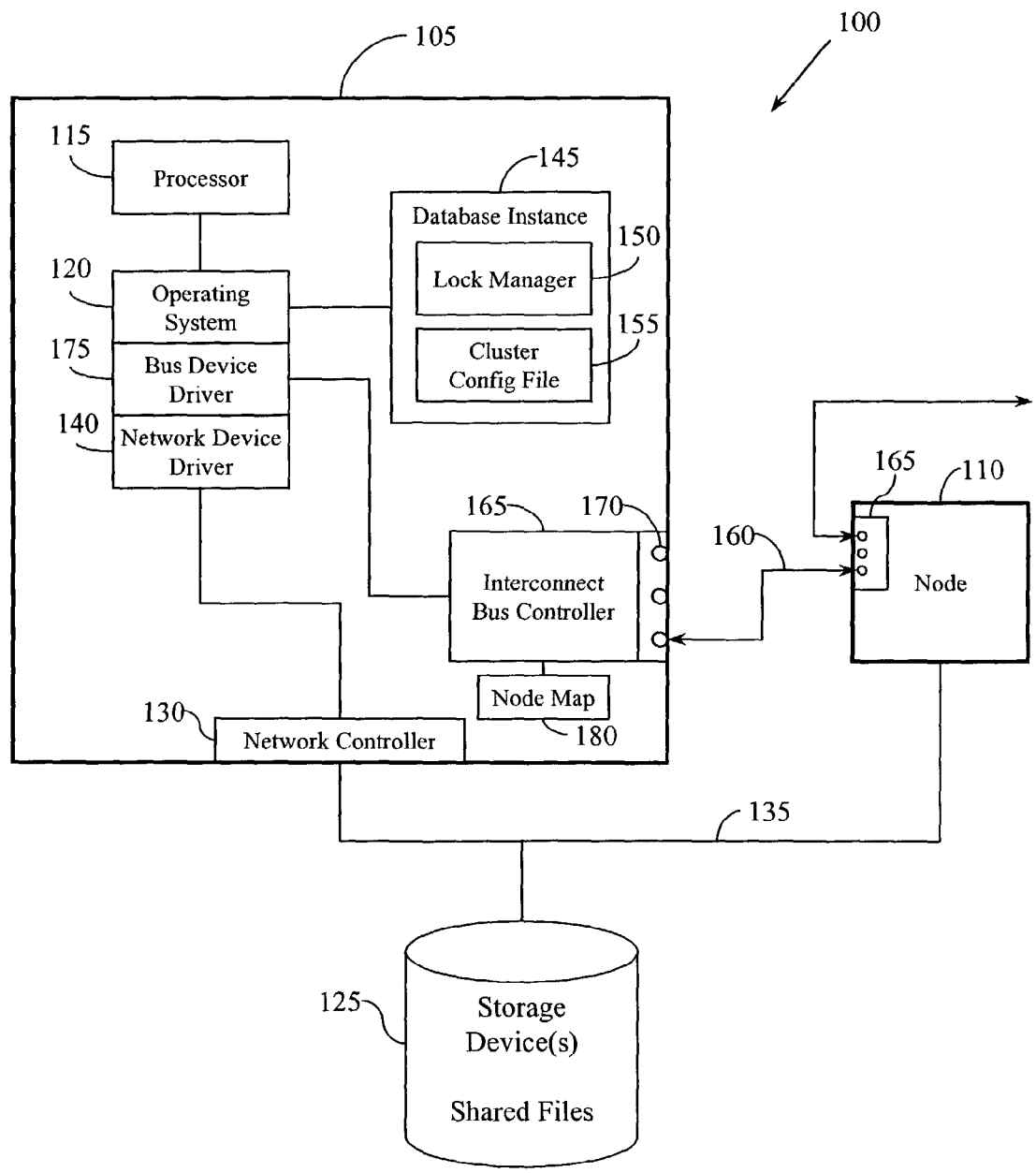
FIG. 1 is an example system diagram of one embodiment of a cluster node in accordance with the present invention.

Illustrated in FIG. 1 is one embodiment of a simplified clustered database system 100 in accordance with one embodiment of the present invention. Although two nodes are shown in the example, node 105 and node 110, different numbers of nodes may be used and clustered in different configurations. Although a database cluster is used as an example, the system can also be applied to other types of clustered systems. Each node is a computer system that executes software and processes information. The computer system may be a personal computer, a server, or other computing device. Each node may include a variety of components and devices such as one or more processors 115, an operating system 120, memories, data storage devices, data communication buses, and network communication devices. Each node may have a different configuration from other nodes. An example of one type of clustering system is described in U.S. Pat. No. 6,353,836, entitled "METHOD AND APPARATUS FOR TRANSFERRING DATA FROM THE CACHE OF ONE NODE TO THE CACHE OF ANOTHER NODE," assigned to the present assignee, and which is incorporated herein by reference in its entirety for all purposes.

With further reference to FIG. 1, node 105 will be used to describe an example configuration of a node in the clustered database system 100. In this embodiment, nodes are networked in a data sharing arrangement where each node has access to one or more data storage devices 125. The data storage devices 125 can maintain a variety of files such as database files that may be shared by the nodes connected in the cluster. A network controller 130 connects the node 105 to a network 135. The operating system 120 includes a communication interface between software applications running on the node 105 and the network controller 130. For example, the interface may be a network device driver 140 that is programmed in accordance with the selected communications protocol of the network 135.

Examples of communication protocols that may be used for network controller 130 and network 135 include the Fibre Channel ANSI Standard X3.230 and/or the SCSI-3 ANSI Standard X3.270. The Fibre Channel architecture provides high speed interface links to both serial communications and storage I/O. Other embodiments of the network controller 130 may support other methods of connecting the storage device 125 and nodes 105, 110 such as embodiments utilizing Fast-40 (Ultra-SCSI), Serial Storage Architecture (SSA), IEEE Standard 1394, Asynchronous Transfer Mode (ATM), Scalable Coherent Interface (SCI) IEEE Standard 1596-1992, or some combination of the above, among other possibilities.

The node 105 further includes a database instance 145 that manages and controls access to data maintained in the one or more storage devices 125. Since each node in the clustered database system 100 executes a database instance that allows that particular node to access and manipulate data on the shared database in the storage device 125, a lock manager 150 is provided. The lock manager 150 is an entity that is responsible for granting, queuing, and keeping track of locks on one or more resources, such as the shared database stored on the storage device 125. Before a process can perform an operation on the shared database, the process is required to obtain a lock that grants to the process a right to perform a desired operation on the database. To obtain a lock, a process transmits a request for the lock to a lock manager. To manage the use of resources in a network system, lock managers are executed on one or more nodes in the network.

A lock is a data structure that indicates that a particular process has been granted certain rights with respect to the resource. There are many types of locks. Some types of locks may be shared by many processes while other types of locks prevent any other locks to be granted on the same resource. A more detailed description of one example of a lock management system is found in U.S. Pat. No. 6,405,274 B1 entitled "ANTICIPATORY LOCK MODE CONVERSIONS IN A LOCK MANAGEMENT SYSTEM," assigned to the present assignee, and which is incorporated herein by reference in its entirety for all purposes.

To keep track of and manage the nodes on the network that may have access to the storage device 125, a cluster configuration file 155 is maintained. The cluster configuration file 155 contains a current list of active nodes in the cluster including identification information such as node address, node ID, and connectivity structure (e.g. neighbor nodes, parent-child nodes). Of course, other types of information may be included in such a configuration file and may vary based on the type of network system. When a topology change occurs in the cluster, the node is identified and the cluster configuration file 155 is updated to reflect the current state of the cluster node. Examples of topology changes include when a node is added, removed, or stops operating.

With further reference to FIG. 1, the database cluster system 100 further includes an interconnect network 160 that provides node-to-node communication between the nodes 105 and 110. The interconnect network 160 provides a bus that allows all nodes on the network to have two-way communication with each other. The interconnect 160 provides an active communication protocol for sending messages and data to and from each node over the same bus. To be connected to the interconnect network 160, each node includes an interconnect bus controller 165 which may be a peripheral card plugged into a PCI slot of the node. The controller 165 includes one or more connection ports 170 for connecting cables between nodes. Three connection ports are illustrated in port 170 although different numbers of ports may be used.

In one embodiment, the interconnect bus controller 165 operates in accordance with IEEE 1394 protocol, also known as firewire or i.LINK. In order for the database instance 145, or other application running on node 105, to communicate with the interconnect bus 160, a bus device driver 175 is provided. The bus device driver 175 works with the operating system 120 to interface applications with the interconnect bus controller 165. For example, database commands from the database instance 145 are translated by the bus device driver 165 to IEEE 1394 commands or open host controller interface (OHCI) commands. The IEEE 1394 OHCI specification defines standard hardware and software for connections to the IEEE 1394 bus. OHCI defines standard register addresses and functions, data structures, and direct memory access (DMA) models.

IEEE 1394 is a bus protocol that provides easy to use, low cost, high speed communications. The protocol is very scaleable, provides for both asynchronous and isochronous applications, allows for access to large amounts of memory mapped address space, and allows peer-to-peer communication. It will be appreciated by one of ordinary skill in the art that the interconnect bus controller 165 may be modified to accommodate other versions of the IEEE 1394 protocol such as IEEE 1394a, 1394b, or other future modifications and enhancements.

The IEEE 1394 protocol is a peer-to-peer network with a point-to-point signaling environment. Nodes on the bus 160 may have several ports on them, for example ports 170. Each of these ports acts as a repeater, retransmitting any data packets received by other ports within the node. Each node maintains a node map 180 that keeps track of the current state of the network topology/configuration. In its current form, the IEEE 1394 protocol supports up to 63 devices on a single bus, and connecting to a device is as easy as plugging in a telephone jack. Nodes, and other devices, can be instantly connected without first powering down the node and re-booting the network. Management of the database cluster topology will be described in greater detail below.

With the interconnect network 160, the database 145 in node 105 may directly request data, transmit/receive data, or send messages to a running database application on node 110 or other node in the cluster. This avoids having to send messages or data packets to the storage device 125 which would involve one or more intermediate steps, additional disk I/O, and would increase latency.

Figure 2:
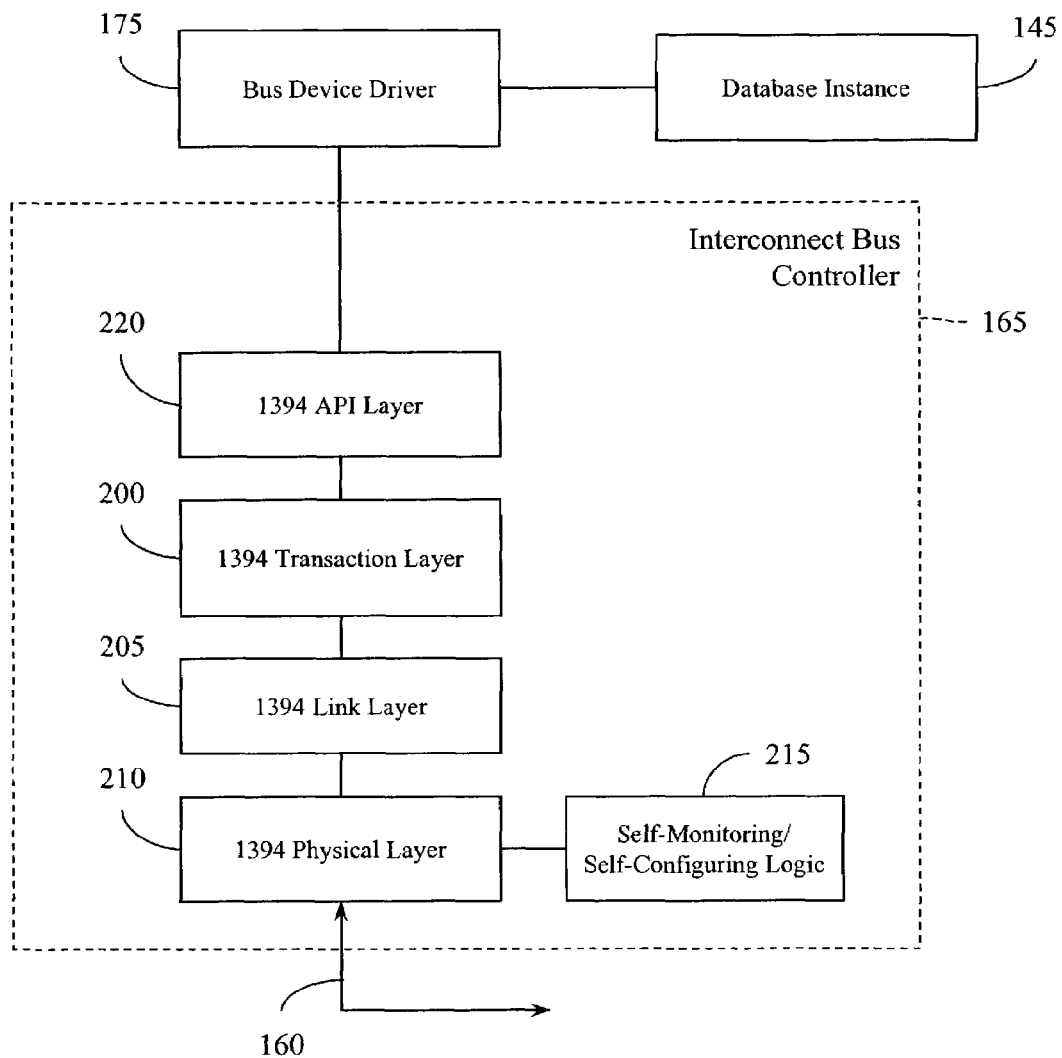
FIG. 2 is an example diagram of the interconnect bus controller of FIG. 1.

Illustrated in FIG. 2 is an example of the interconnect bus controller 165 based on the IEEE 1394 standard. It includes three ISO protocol layers: a transaction layer 200, a link layer 205 and a physical layer 210. The layers may be implemented in logic as defined above including hardware, software, or both. The transaction layer 200 defines a complete request-response protocol to perform bus transactions with three basic operations: read, write, and lock. The link layer 205 is the midlevel layer and it interacts with both the transaction layer 200 and the physical layer 210, providing asynchronous and isochronous delivery service for data packets. Components to control data delivery include a data packet transmitter, data packet receiver, and a clock cycle controller.

The physical layer 210 provides the electrical and mechanical interface between the controller 165 and a cable(s) that forms part the interconnect bus 160. This includes the physical ports 170. The physical layer 210 also ensures that all nodes have fair access to the bus using an arbitration mechanism. For example, when a node needs to access the bus, it sends a request to its parent node(s), which forwards the request to a root node. The first request received by the root is accepted; all others are rejected and withdrawn. The closer the node is to the root, the better its chance of acceptance. To solve consequent arbitration unfairness, periods of bus activity are split into intervals. During an interval, each node gets to transmit once and then it waits until the next interval. Of course, other schemes may be used for arbitration.

Other functions of the physical layer 210 include data resynchronization, encoding and decoding, bus initialization, and controlling signal levels. As mentioned previously, the physical layer of each node also acts as a repeater, translating the point-to-point connections into a virtual broadcast bus. A standard IEEE 1394 cable provides up to 1.5 amps of DC power to keep remote devices "aware," even when they are powered down. Based on IEEE 1394, the physical layer also allows nodes to transmit data at different speeds on a single medium. Nodes, or other devices, with different data rate capabilities communicate at the slower device rate.

The interconnect bus controller 165, operating based on IEEE 1394 protocol, is an active port and provides for a self-monitoring/self-configuring serial bus. This is known as hot plug-and-play that allows users to add or remove devices even if the bus is active. Thus, nodes and other devices may be connected and disconnected without interrupting network operation. A self-monitoring/self-configuring logic 215 automatically detects topology changes in the cluster system based on changes in the interconnect bus signal. The bus controller 165 of a node places a bias signal on the interconnect bus 160 once the node is connected to the bus. Neighboring nodes, through the self-monitoring logic 215, automatically detect the bias signal which may appear as a change in voltage. Thus, the detected bias signal indicates that a node has been added and/or that the node is still active. Conversely, the absence of the bias signal indicates that a node has been removed or has stopped functioning. In this manner, topology changes can be detected without using polling messages that are transmitted between nodes. The self-configuring aspect of the logic 215 will be described in greater detail with reference to FIGS. 6 and 7.

An application program interface (API) layer 220 may be included in the bus controller 165 as an interface to the bus device driver 175. It generally includes higher level system guidelines/interfaces that bring the data, the end system design, and the application together. The API layer 220 may be programmed with desired features to customize communication between the database instance 145 (and other applications) and the interconnect bus controller 165. Optionally, the functions of the API layer 220 may be embodied in whole or in part within the transaction layer 200 or the bus device driver 175.

Figure 3:
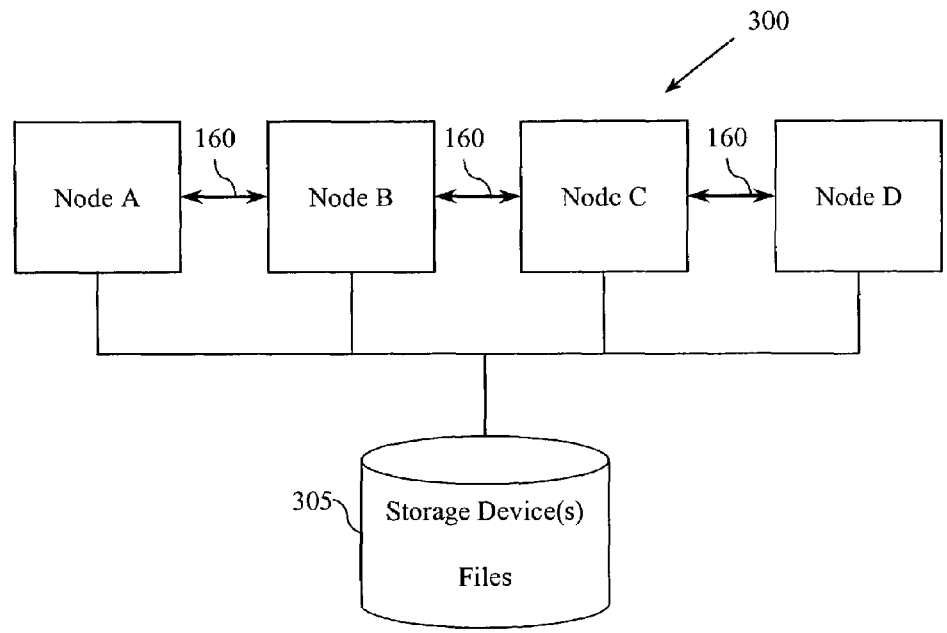
FIG. 3 is an example of a shared disk cluster architecture.

With reference to FIG. 3, one embodiment of a database cluster architecture 300 is shown in which the present system and method may be implemented. The architecture 300 is generally known as a shared disk architecture and is similar to FIG. 1 except that additional nodes are shown. Generally in a shared disk database architecture, files and/or data are logically shared among the nodes with each database instance having access to all data. The shared disk access is accomplished, for example, by direct hardware connectivity to one or more storage devices 305 that maintain the files. Optionally, the connections may be performed by using an operating system abstraction layer that provides a single view of all the storage devices 305 on all the nodes. The nodes A-D are also connected via the node interconnect 160 to provide node-to-node communication. In the shared disk architecture, transactions running on any database instance within a node can directly read or modify any part of the database on storage device 305. Access is controlled by one or more lock managers as described previously.

Figure 4:
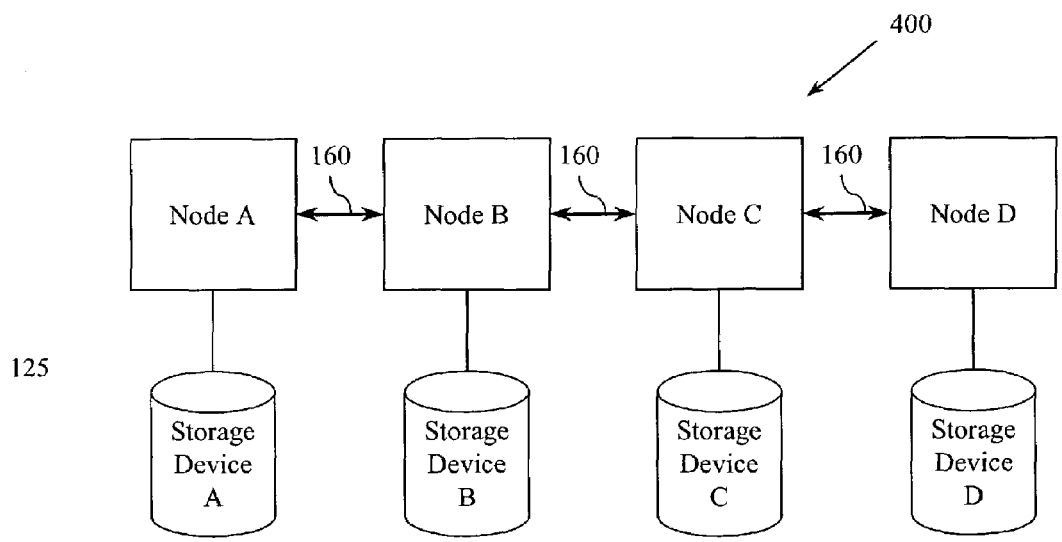
FIG. 4 is an example of an share-nothing cluster architecture.

With reference to FIG. 4, another embodiment of a cluster architecture is shown that may incorporate the present system and method. Cluster architecture 400 is typically referred to as a shared-nothing architecture. An example of a shared-nothing architecture is described in U.S. Pat. No. 6,321,218, entitled "HYBRID SHARED NOTHING/SHARED DISK DATABASE SYSTEM," assigned to the present assignee, and which is incorporated herein by reference in its entirety for all purposes. In a pure shared-nothing architecture, database files, for example, are partitioned among the database instances running on nodes A-D. Each database instance or node has ownership of a distinct subset of the data and all access to this data is performed exclusively by this "owning" instance. The nodes are also connected with the interconnect 160.

For example, if data files stored on storage devices A-D contained employee files, the data files may be partitioned such that node A controls employee files for employee names beginning with the letters A-G, node B controls employee files on storage device B for employee names H-N, node C controls employee files for names "O-U" on storage device C and node D controls employee file names "V-Z" on storage device D. To access data from other nodes, a message would be sent requesting such data. For example, if node D desired an employee file which was controlled by node A, a message would be sent to node A requesting the data file. Node A would then retrieve the data file from storage device A and transmit the data to node D. It will be appreciated that the present system and method may be implemented on other cluster architectures and configurations such as tree structures and with other data access rights and/or restrictions as desired for a particular application.

Figure 5:
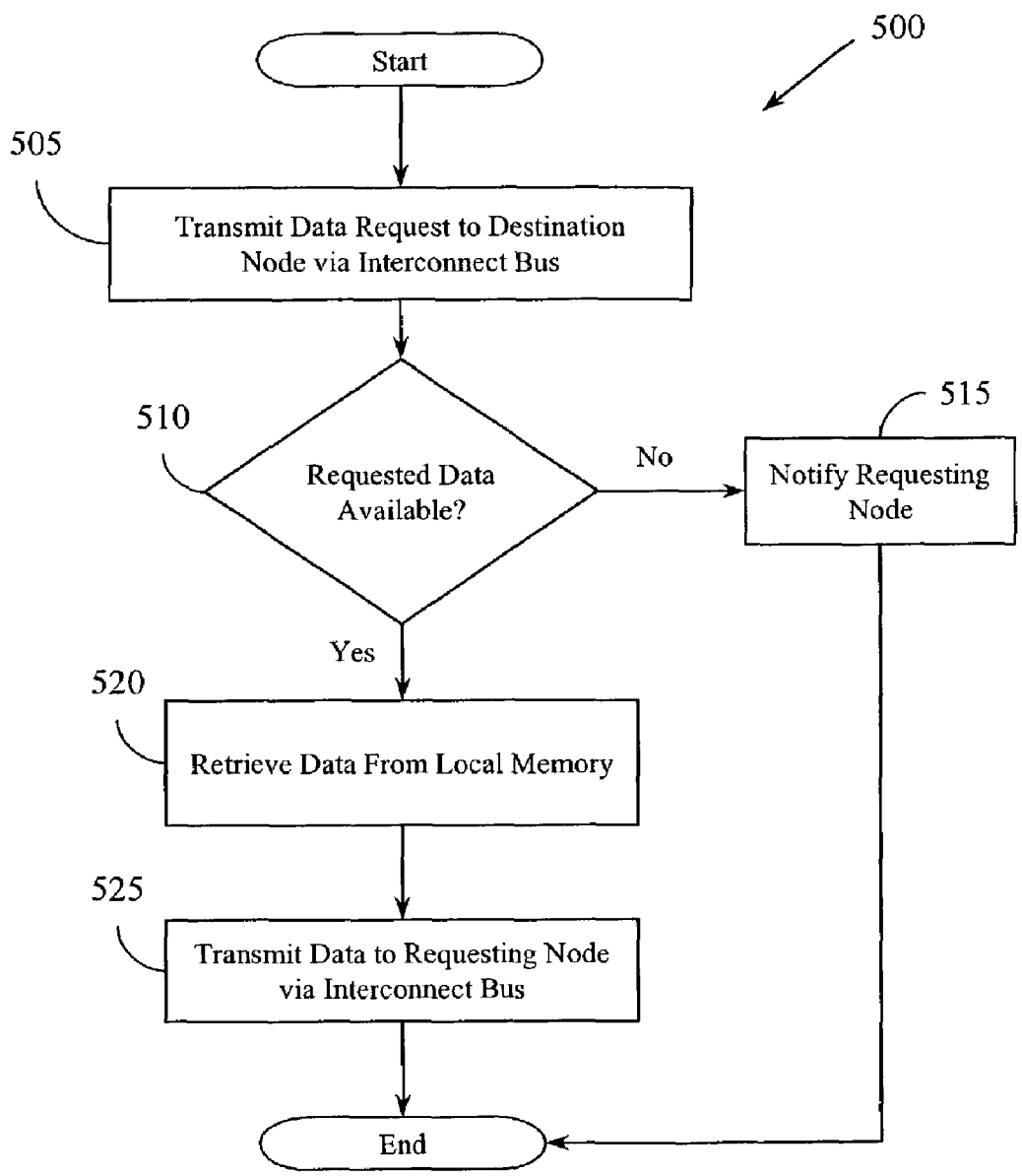
FIG. 5 is an example methodology of communicating data using the interconnect bus.

Illustrated in FIG. 5 is one embodiment of a methodology associated with the cluster system of FIG. 3 or 4. The embodiment describes directly transmitting and receiving data between nodes using the interconnect bus 160. The illustrated elements denote "processing blocks" and represent computer software instructions or groups of instructions that cause a computer to perform an action(s) and/or to make decisions. Alternatively, the processing blocks may represent functions and/or actions performed by functionally equivalent circuits such as a digital signal processor circuit or an application specific integrated circuit (ASIC). The diagram, as well as the other illustrated diagrams, does not depict syntax of any particular programming language. Rather, the diagram illustrates functional information one skilled in the art could use to fabricate circuits, to generate computer software, or a combination of hardware and software to perform the illustrated processing. It will be appreciated that electronic and software applications may involve dynamic and flexible processes such that the illustrated blocks can be performed in other sequences different than the one shown and/or blocks may be combined or, separated into additional components. They may also be implemented using various programming approaches such as machine language, procedural, object oriented and/or artificial intelligence techniques. The foregoing applies to all methodologies described herein.

With reference to FIG. 5, diagram 500 is one example of communicating data between nodes using the node-to-node interconnect network 160. When a node (a requesting node) desires data from another node, a data request message is transmitted (block 505) to a destination node via the interconnect bus 160. The data request may be sent directly to one or more selected destination nodes by attaching the node name and/or address to the request. If the location of the requested data is unknown, the data request may be broadcasted to each node in the interconnect network.

When the data request is received by the appropriate node, the database instance determines whether the data is available on that node (block 510). If the data is not available, a message is transmitted to the requesting node that the data is not available (block 515). If the data is available, the data is retrieved from local memory (block 520) by direct memory access, and it is transmitted to the requesting node over the interconnect bus (block 525). Remote direct memory access can also be implemented to perform a direct memory to memory transfer. In this manner, messages and data may be transmitted directly between nodes without having to transmit the messages or data to a shared storage device. The node-to-node communication reduces latency and reduces the number of disk inputs/outputs.

Figure 6:
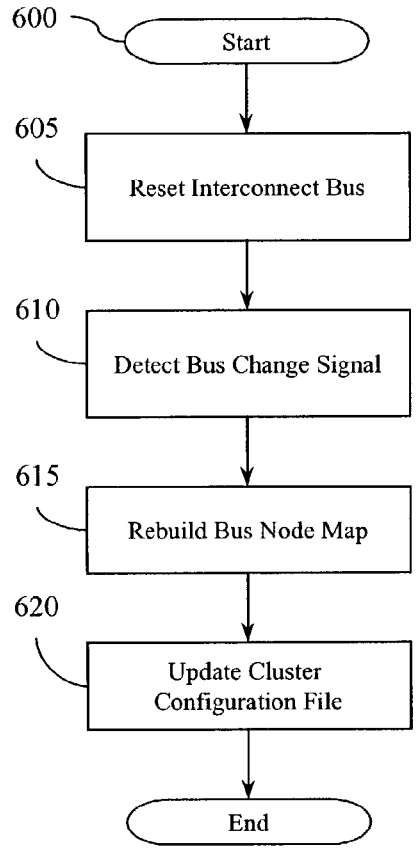
FIG. 6 is an example methodology of detecting a topology change.

Illustrated in FIG. 6 in an example methodology of reconfiguring the cluster architecture based on the IEEE 1394 bus protocol. When a node in the database cluster is added, removed, or stops functioning, the database cluster needs to detect the change, identify the node, and the cluster needs to be reconfigured appropriately. As described previously, the interconnect bus controller 165 (FIG. 1), operating based on IEEE 1394 protocol, is an active port and provides for a self-configuring serial bus. Thus, nodes and other devices may be connected and disconnected without interrupting network operation.

For example, when a node is added to the bus, the bus is reset (block 605). The interconnect controller 165 of the added node automatically sends a bias signal on the bus and neighboring nodes can detect its bias signal (block 610). Similarly, the absence of a node's bias signal can be detected when a node is removed. In other words, the interconnect controller 165 of neighboring nodes can detect signal changes on the interconnect bus 160 such as a change in the bus signal strength caused by adding or removing a node. The topology change is then transmitted to all other nodes in the database cluster. The bus node map is rebuilt with the changes (block 615). In one embodiment, the node map can be updated with the changes. The database instance is notified and it updates the cluster configuration file (block 620) to keep track of the active nodes for the lock managers. Of course, the order of the illustrated sequence may be implemented in other ways.

Using the IEEE 1394 protocol, the interconnect controller 165 is an active port that includes a self-monitoring/self-configuration mechanism as described above. With this mechanism, the database cluster system can be reconfigured without the added latency involved with polling mechanisms since nodes can virtually instantly detect a change in the topology. The active port also allows reconfiguration of the cluster without having to power-down the network.

Figure 7:
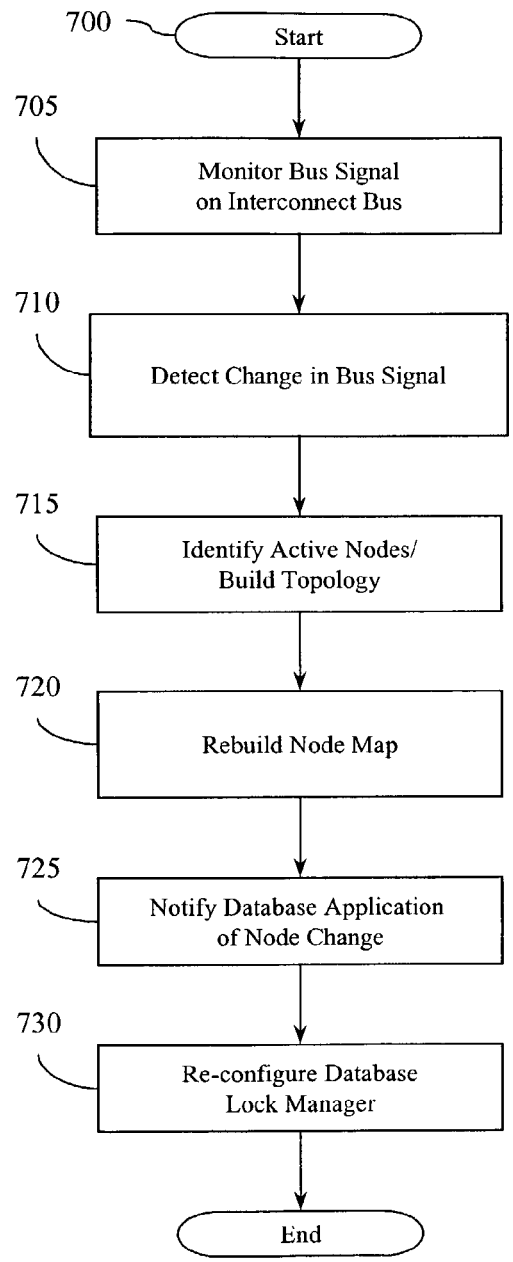
FIG. 7 is another example methodology of detecting a topology change.

Illustrated in FIG. 7 is another embodiment of detecting and reconfiguring the cluster. Each node monitors the interconnect bus (block 705) to detect a change in the bus signal such as the presence or absence of a bias signal. When a node detects a topology change (block 710), it sends a bus reset signal on the bus, starting a self-configuring mechanism. This mechanism, managed by the physical layer 210, may include three phases: bus initialization, tree identification, and self identification. During bus initialization, active nodes are identified and a treelike logical topology is built (block 715). Each active node is assigned an address, a root node is dynamically assigned, and the node map is rebuilt or updated with the new topology (block 720). Once the bus is configured itself, the nodes can then access the bus. The database instances on each node are notified of the topology change (block 725) and the database lock manager(s) are reconfigured with the changes so that the shared database can be managed properly throughout the cluster (block 730).

It will be appreciated that the network connections, such as network 135 may be implemented in other ways. For example, it may include communications or networking software such as the software available from Novell, Microsoft, Artisoft, and other vendors, and may operate using TCP/IP, SPX, IPX, and other protocols other twisted pair, coaxial, or optical fiber cables, telephone lines, satellites, microwave relays, radio frequency signals, modulated AC power lines, and/or other data transmission wires known to those of skill in the art. The network 135 can be connectable to other networks through a gateway or similar mechanism. It will also be appreciated that the protocol of the interconnect bus 160 may include a wireless version.

Figure 8:
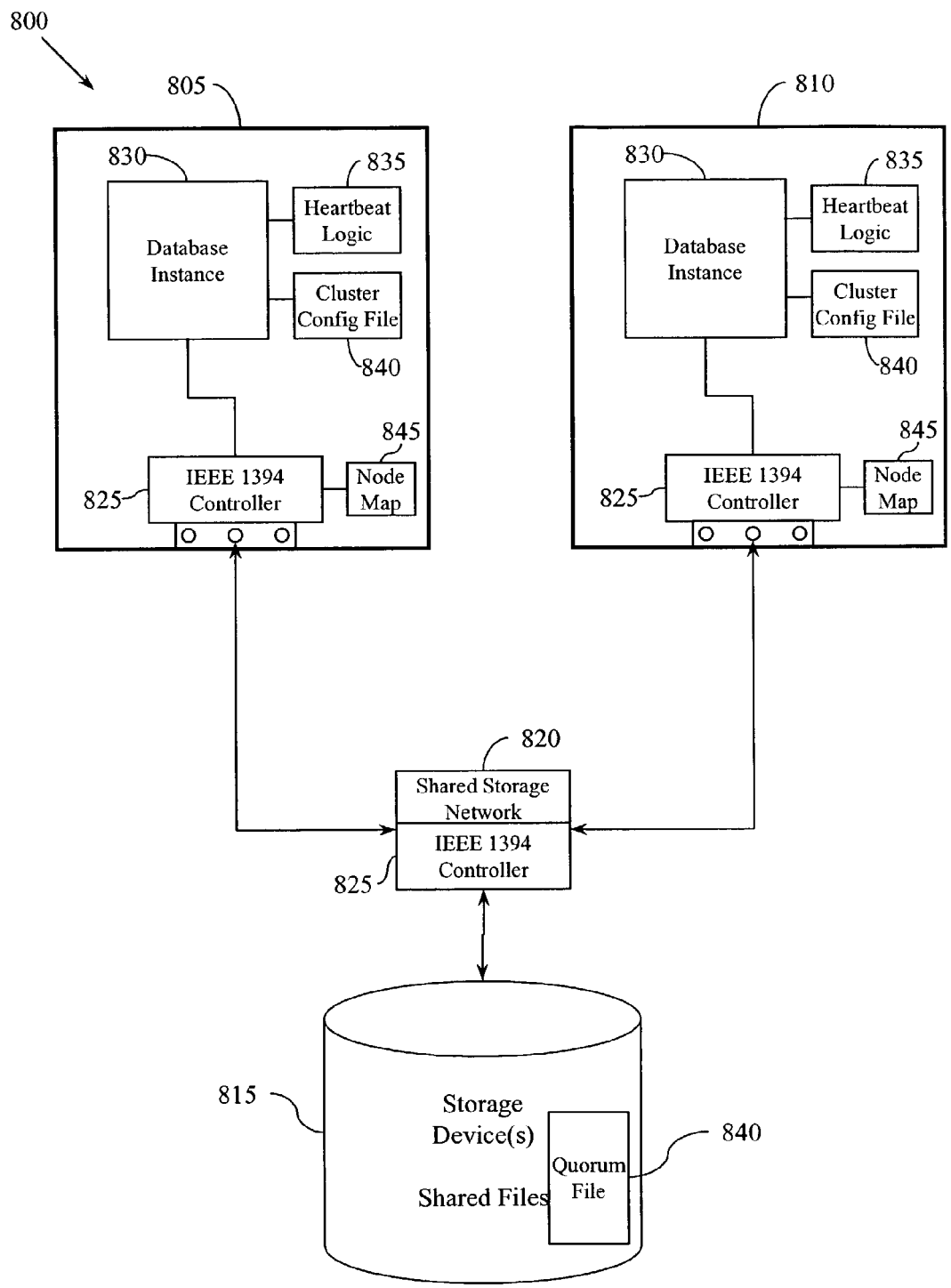
FIG. 8 is another embodiment of a cluster including a heartbeat system.

With reference to FIG. 8, one embodiment of a heartbeat system is shown for a database cluster 800. A heartbeat system is a mechanism where nodes periodically generate signals or messages indicating that they are active and functioning. The mechanism also allows nodes to determine the health or status of other nodes in the cluster based on the generated signals. As shown, the cluster 800 includes nodes 805 and 810 although any number of nodes may be connected to the cluster. The illustrated nodes may have a similar configuration as the nodes shown in FIG. 1. However, a simplified configuration is shown for illustrative purposes.

The nodes 805, 810 share access to a storage device 815 that maintains files such as database files. The nodes are connected to the storage device 815 by a shared storage network 820. In one embodiment, the network 820 is based on IEEE 1394 communication protocol. To communicate with each other, nodes 805, 810 and the storage device 815 include an IEEE 1394 network controller 825. The network controller 825 is similar to the interconnect bus controller 165 and in one embodiment, is a network card that is plugged into each device. Alternatively, the controller may be fixed within the node. The network controller 825 includes one or more ports so that cables can be connected between each device. Additionally, other types of network connections may be utilized, for example wireless connections, that are based on the IEEE 1394 protocol, or other similar protocol standards.

With further reference to FIG. 8, each node includes a database instance 830 that controls access to the files on the storage device 815. Since resources are shared between nodes in the database cluster 800, each node includes logic to inform other nodes of their health and includes logic to determine the health of other nodes on the network. For example, a heartbeat logic 835 is programmed to generate and transmit a heartbeat message within a predetermined time interval. A heartbeat message is also referred to as a status signal. The predetermined time interval may be any selected interval but is typically on the order of milliseconds to seconds, for example, 300 milliseconds to 5 seconds. So if the interval is one second, each node would transmit a heartbeat message every one second.

Figure 9:
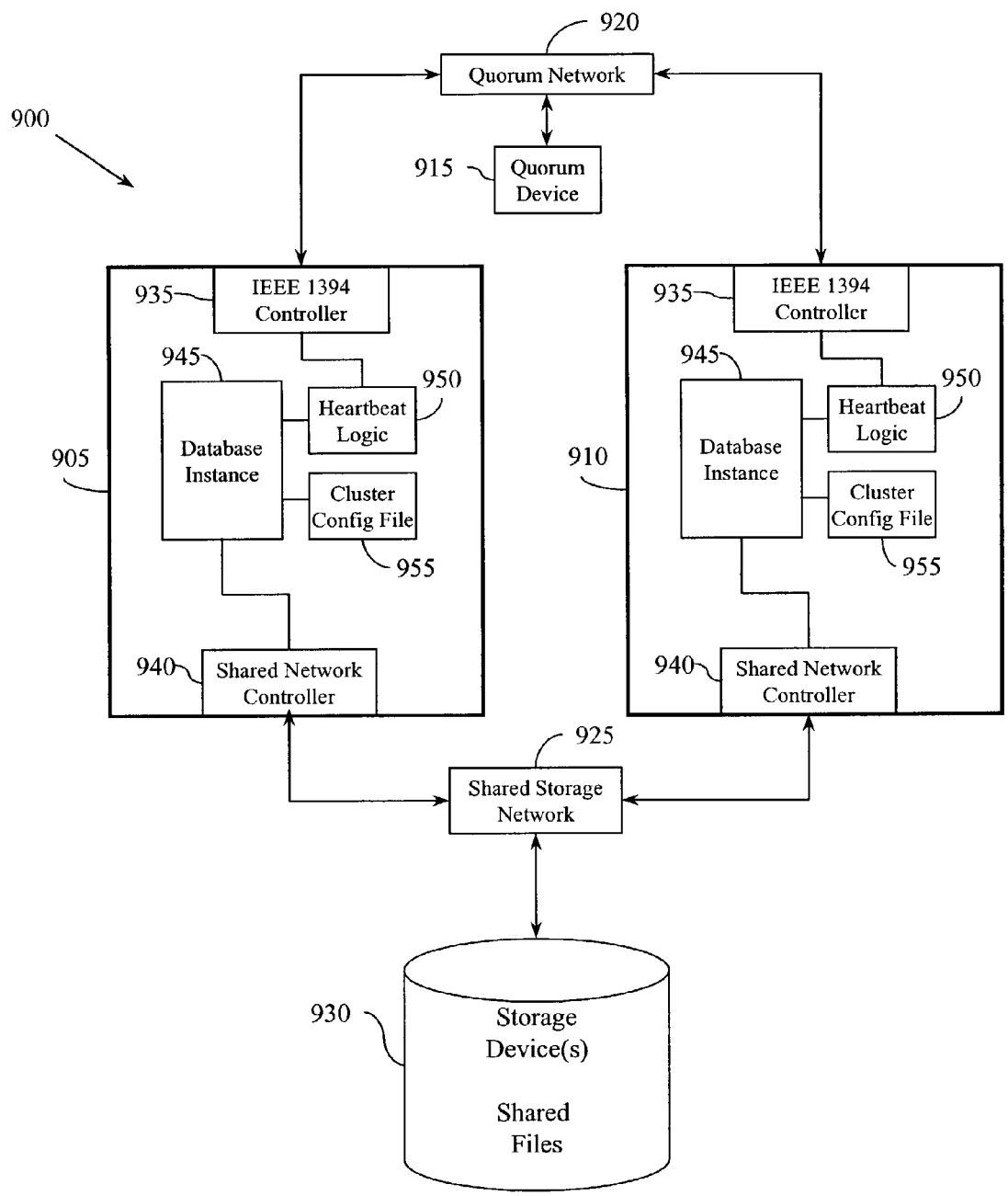
FIG. 9 is another embodiment of a heartbeat system.

In one embodiment, the network load is used as a factor in determining the heartbeat time interval. For example, if heartbeat messages are transmitted on the same network as data, then a high frequency of heartbeat messages on the network may cause delays in data transmission processes. FIG. 8 shows a network that may be impacted by this situation while FIG. 9 shows a network that reduces the amount of network traffic by implementing the heartbeat system on a different network. It will be further appreciated that the networks of FIGS. 8 and 9 may also be configured as a shared-nothing architecture.

With reference again to FIG. 8, heartbeat messages from each node are collected and stored in a quorum file 840. In this embodiment, the quorum file 840 is one or more files or areas defined within the storage device 815 which also maintains the shared files. Each node in the cluster 800 is allocated address space within the quorum file 840 to which its heartbeat messages are stored. The space of the quorum file 840 is typically equally divided and allocated to each node although other configurations may be possible. Thus, the quorum file 840 can be implemented as a separate file for each node rather than one file for the entire cluster even though the file may be logically defined as one data structure. The quorum file may be implemented as a stack, an array, a table, a linked list, a text file or other type of data structure, stored in one or more memory locations, registers, or other type of storage area. Once a node's quorum space is full, the oldest messages in the space are pushed out or overwritten as new messages are received.

Illustrated in FIG. 9 is another embodiment of a database cluster 900 and a heartbeat system. In this embodiment, nodes 905 and 910 communicate with a quorum device 915 over a quorum network 920. The quorum network 920 is a separate network than a shared storage network 925. Thus, the nodes access shared files on storage device 930 using a different network bus than the quorum network. The quorum network 920 may be part of a node-to-node interconnect network as previously described. The quorum device 915 includes data storage configured to maintain a quorum file for storing heartbeat messages received from the nodes in the cluster.

With further reference to FIG. 9, the nodes 905, 910 are connected to the quorum device 915 and communicate to each other in accordance with the IEEE 1394 communication protocol. Each node and the quorum device 915 includes an IEEE 1394 controller 935 similar to the controllers described previously. Since a separate network is configured for data communication to the files, each node includes a separate shared network controller 940 that communicates to the storage device 930. The shared network controller 940 may be an IEEE 1394 controller or other network protocol such as fibre channel protocol. A database instance 945 within each node processes data requests over the shared network controller 940.

A heartbeat logic 950 controls the heartbeat mechanism and uses the IEEE 1394 controller 935 to communicate with the quorum device 915. With this architecture, adding or replacing a quorum devices 915 within an existing database cluster 900 can be easily performed with minimal impact on the existing network. Also, since the heartbeat mechanism is processed over a separate network, traffic on the shared storage network 925 is reduced allowing quicker responses for data processing requests. It will also be appreciated that the clusters of FIGS. 8 and 9 may include a node-to-node interconnect network.

Figure 10:
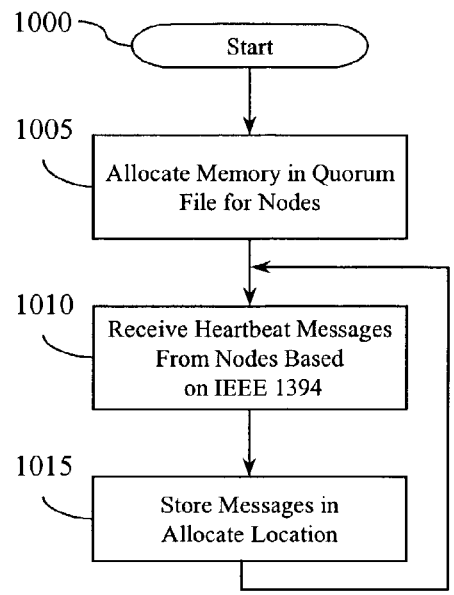
FIG. 10 is an example methodology of maintaining a quorum file.

Illustrated in FIG. 10 is an example methodology 1000 of a heartbeat system performed with the quorum file 840 or quorum device 915, both of which will be referred to below as a quorum file. Once a quorum file is configured and activated within a database cluster, memory within the quorum file is allocated to each of the nodes in the cluster (block 1005). The quorum file may be equally divided and allocated to each node or other allocations may be defined. Once the quorum file is active, it receives heartbeat messages from each node in accordance with the IEEE 1394 protocol (block 1010). Each heartbeat message includes a node identifier that identifies the node sending the message and a time stamp indicating the time of the message. Each message received by the quorum file is then stored in its node's allocated location (block 1015) and the process repeats for each received heartbeat message.

For each node, heartbeat messages are stored in the quorum file in the order they are received. Thus, by comparing the most recently received time stamps to the current time, the system can determine which nodes are actively sending their heartbeat messages. This information can indicate whether a node is active or not. For example, if a node has missed a predetermined number of consecutive time stamps, a potential problem may be assumed. Any number of messages can be stored for each node including one message. As mentioned previously, the heartbeat logic of each node is programmed to generate and transmit a heartbeat message at a predetermined interval. Thus, by reading the data from the quorum file, the logic can determine if a number of missed intervals has occurred. This type of status check logic may be part of the heartbeat logic 835 or 950 and will be described in greater detail with reference to FIG. 11.

Figure 11:
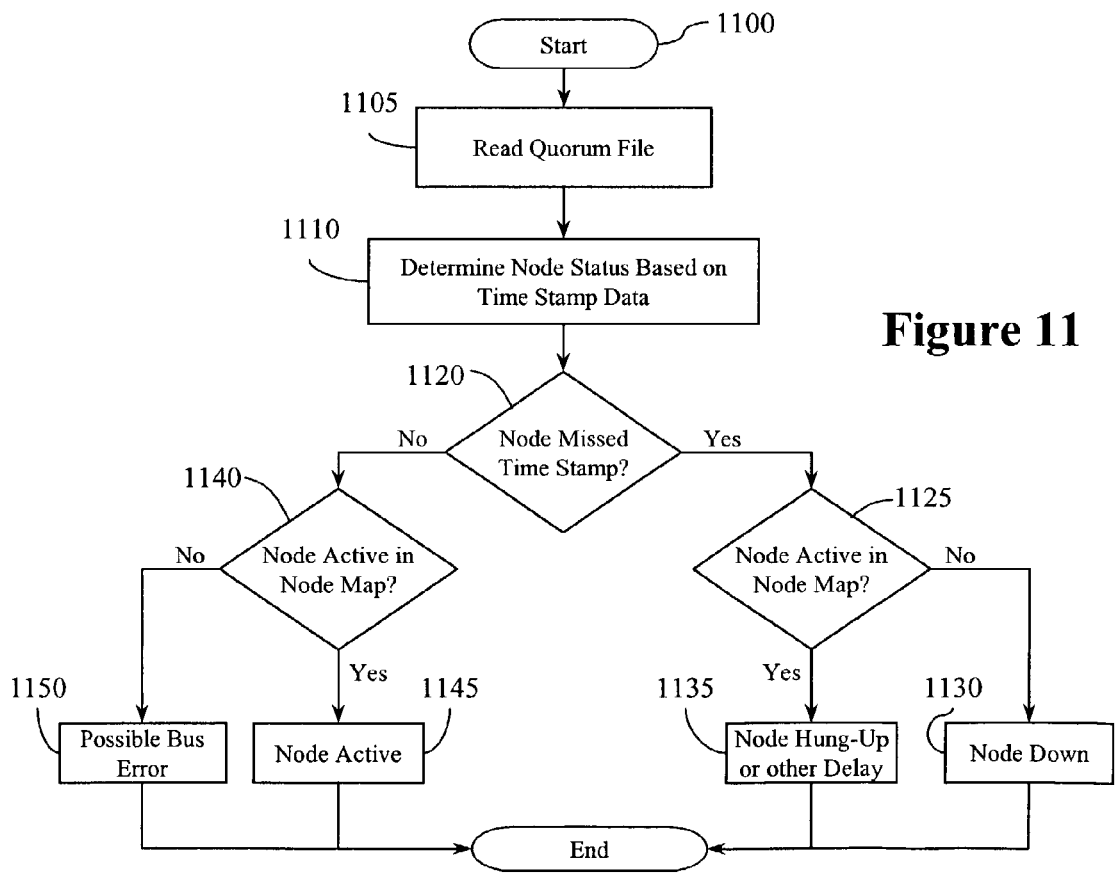
FIG. 11 is an example methodology of determining the status of a node using the quorum file.

FIG. 11 illustrates an example methodology for determining the health or status of a node. As described previously, the heartbeat logic includes logic for generating each heartbeat message at the predetermined time interval and transmitting the message to the quorum file. At any desired time, the heartbeat logic of a node may update its cluster configuration file to determine the current set of active nodes and to determine if any nodes have stopped functioning or otherwise have been removed from the network. This determination may also be synchronized throughout the cluster. A status check logic (not illustrated) may be programmed as part of the heartbeat logic to perform this task as follows.

To begin a status check, the quorum file is read to review the time stamped information for each of the nodes (block 1105). Based on the time stamped data stored for each node, the logic can determine if a particular node is still functioning based on the time of the last messages written to the quorum file (block 1110). A threshold may be set to allow a predetermined number of time stamps to be missed before the determination indicates that a problem may exist. For example, a node may be allowed to miss two consecutive time stamps but if a third is missed, then the node may not be functioning properly. The threshold may also be set to other values, for example a value of 1.

If a node misses the designated amount of time stamp messages (block 1120), it may not necessarily mean that the node has stopped functioning. Since the nodes are connected to the quorum file in accordance with the IEEE 1394 standard, an additional status check can be performed. As explained previously, the IEEE 1394 bus is active and each device connected to the bus can detect if a neighboring node stops functioning or is removed from the network. This additional information may help to better determine the health of a node. The status logic can compare the time stamp information from the quorum file and the node map data maintained by the IEEE 1394 controller.

For example, if a node misses its time stamp (block 1120) and the node is not an active node in the node map (block 1125), then it is determined that the node is presumed down or has been removed from the network (block 1130). However, if a node misses its time stamp but the node is still active in the node map, then the node is possibly hung-up or some other delay may exist in the cluster (block 1135). If this is the case, the process may optionally re-check the quorum file for that node to determine if a new time stamp has been received, a message can be generated to indicated a possible delay, and/or the node can be removed from the active node list.

Referring to decision block 1120 again, if a node does not miss its time stamp, the node is presumably functioning properly. However, an additional determination may be made by checking if the node is active in the node map (block 1140). If the node is active (block 1145), then the node is functioning properly. If the node is not active (block 1150), then a possible network bus error may exist. Thus, with information from both the quorum file and the node map of the IEEE 1394 bus, a more detailed analysis of node health may be determined. Furthermore, in the cluster configuration shown in FIG. 9 in the embodiment where the shared storage network 925 is also a IEEE 1394 bus, two separate network node maps are maintained. The additional node map may also be included in the above comparison process and status check.

With reference again to FIG. 11, a simplified embodiment may be implemented. At the decision block 1120, if a node fails to write its time stamps, the logic can declare that node as non-functioning and remove it from the cluster configuration file of the database instances. In this process, the node maps are not reviewed.

It will be appreciated that the various storage devices described herein, including the quorum device for allocating a quorum file, may be implemented in numerous ways. For example, a storage device may include one or more dedicated storage devices such as magnetic or optical disk drives, tape drives, electronic memories or the like. A storage device may also include one or more processing devices such as a computer, a server, a hand-held processing device, or similar device that contains storage, memories, or combinations of these for maintaining data. The storage device may also be any computer-readable medium.

Suitable software for implementing the various components of the present system and method are readily provided by those of skill in the art using the teachings presented here and programming languages and tools such as Java, Pascal, C++, C, CGI, Perl, SQL, APIs, SDKs, assembly, firmware, microcode, and/or other languages and tools. The components embodied as software include computer readable/executable instructions that cause a computer to behave in a prescribed manner. The software may be as an article of manufacture and/or stored in a computer readable medium as defined previously.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A heartbeat mechanism for a cluster including a plurality of nodes, comprising:
   a quorum file for receiving heartbeat messages from the plurality of nodes;
   a network controller for connecting the quorum file to the plurality of nodes where the network controller provides communication with the quorum file in accordance with an IEEE 1394 protocol;
   a node map maintained by the network controller for identifying active nodes based on the IEEE 1394 protocol; and
   a status logic for determining a status of a node from the plurality of nodes by comparing heartbeat messages in the quorum file written by the node and the node map.

2. A method of monitoring nodes in a cluster, the method comprising:
   allocating a quorum file for storing status messages received from nodes in the cluster;
   periodically receiving a status message from a node in the cluster indicating that the node is active, the status message being received based on IEEE 1394 communication protocol;
   maintaining a node map of active nodes in the cluster based on the IEEE 1394 communication protocol; and
   determining whether a node is active by comparing status messages in the quorum file and the node map.

* * * * *

UNITED STATES PATENT AND TRADEMARK OFFICE
CERTIFICATE OF CORRECTION

| | | |
|---|---|---|
| PATENT NO. | : 7,451,359 B1 | Page 1 of 1 |
| APPLICATION NO. | : 10/305483 | |
| DATED | : November 11, 2008 | |
| INVENTOR(S) | : Coekaerts | |

It is certified that error appears in the above-identified patent and that said Letters Patent is hereby corrected as shown below:

On the Title page, in Item (56), under "Other Publications" in column 2, line 17, after "Cluster" insert -- System --.

In column 9, line 3, delete "other" and insert -- over --, therefor.

Signed and Sealed this

Twenty-seventh Day of April, 2010

David J. Kappos
*Director of the United States Patent and Trademark Office*